E. D. HOUGH & E. E. WILSON.
FRUIT DRYING APPARATUS.
APPLICATION FILED JUNE 23, 1908.
931,873.
Patented Aug. 24, 1909.
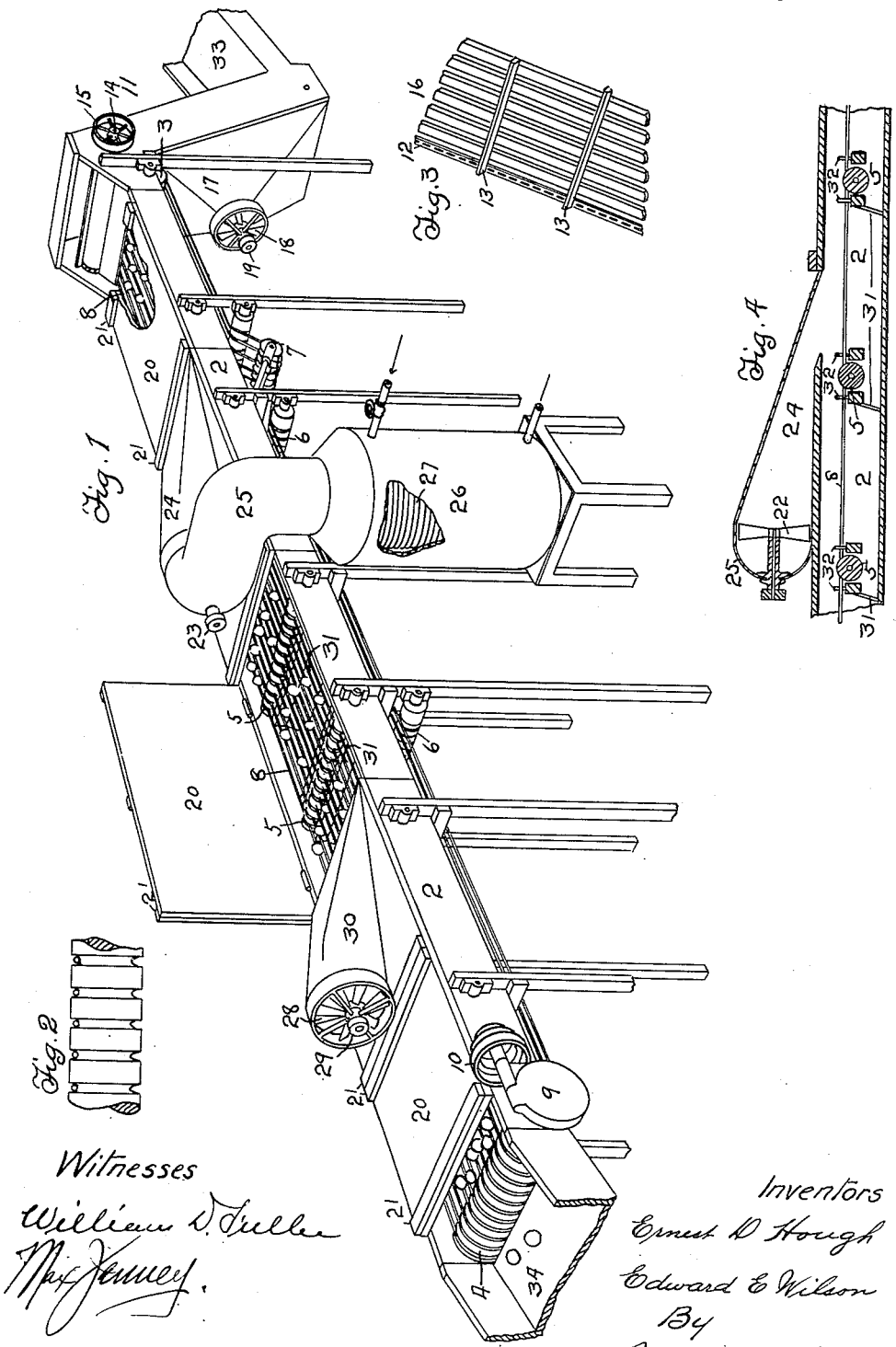

UNITED STATES PATENT OFFICE.

ERNEST D. HOUGH, OF LOS ANGELES, AND EDWARD E. WILSON, OF TUSTIN, CALIFORNIA.

FRUIT-DRYING APPARATUS.

931,873.  Specification of Letters Patent.  Patented Aug. 24, 1909.

Application filed June 23, 1908. Serial No. 440,055.

*To all whom it may concern:*

Be it known that we, ERNEST D. HOUGH, of Los Angeles, California, and EDWARD E. WILSON, of Tustin, California, both citizens of the United States of America, have invented a certain new and useful Fruit-Drying Apparatus; and we do hereby declare the following to be a full, clear, and exact description of the invention, such as will enable others skilled in the art to which it appertains to make and use the same.

This invention relates to an apparatus for drying moisture from articles, particularly from the surface of fruit or the like and consists substantially of means whereby the fruit is presented to the action of one or more currents of air. It may also include means for rendering the air more capable of absorbing moisture, by heating or otherwise. With the foregoing may be combined means for conveying the fruit, means for presenting different sides thereof to the action of the air, and other features.

In the usual method, the fruit, after it has been washed, is placed in a shallow receptacle and exposed to the atmosphere. The air in immediate contact with the fruit soon becomes saturated with moisture and has in its turn to have its moisture absorbed by the adjacent air; consequently the process of drying is very slow, giving the water an opportunity to more or less penetrate the skin of the fruit, rendering it easy of attack by the spores of mildew, mold and similar fungi.

In the operation of the present invention, the drying is accomplished in from two and one-half to five minutes, and, at the same time, the rapid evaporation considerably reduces the temperature of the fruit.

With this device the fruit may be wrapped within a few minutes of the time of washing. The fruit requires less handling, which not only saves labor but enhances the quality of the product. It is also evident that with this invention no drying sheds or rooms are required.

One form of apparatus in which the invention may be embodied is herein described; reference being had to the accompanying drawings, in which, Figure 1 is a perspective view showing the apparatus, portions being broken away. Fig. 2 is a detail of one of the idlers or rollers. Fig. 3 is a perspective detail of the elevator. Fig. 4 is a longitudinal central section of a portion of the apparatus, showing the baffle plates.

At the front and rear ends respectively of the casing 2 of the apparatus are supported drums 3 and 4, and intermediate thereof rollers 5, return idlers 6, and tighteners 7. These drums, rollers and tighteners are grooved for endless cables or ropes 8 which pass around the drums 3 and 4 and over the rollers 5 and are kept in tension by the tighteners. Drum 4 may be driven by worm gearing, inclosed in case 9, and to which power may be communicated by stepped pulley 10.

At the forward end of the apparatus is an elevator 11 which may consist of sprocket chains 12 carrying slats 13 and passing over wheels on a shaft 14 provided with pulley 15; in combination with a perforated or slatted screen 16. The back of the elevator is provided with a hood 17, wherein is located a fan 18 having a driving pulley 19. Casing 2 is provided with hinged covers 20, the cleats 21 whereof are preferably located on the upper side of said covers. A fan 22 having a driving pulley 23 is located at or near the central portion of the apparatus and has a hood 24 which directs the air into the casing toward the front thereof. The suction of fan 22 is through pipe 25 from heater 26 which may be heated by any means, such as steam coil 27.

At the rear end of the apparatus a fan 28 is located, having driving pulley 29 and hood 30. At intervals near the bottom throughout the length of the casing baffle plates 31 are provided.

Rollers 5 are preferably so arranged and the grooves thereon so proportioned that their upper sides are a slight distance above the upper side of the ropes. A plurality of staples 32 may be provided to prevent the ropes from climbing out of the grooves. A chute 33 at the front end of the apparatus, to conduct the fruit thereto from the washers, and a chute 34 at the rear end, to conduct the fruit to the graders, may be provided.

Belt connections from any source of power (not shown) having been made to pulleys 10, 15, 19, 23 and 29, the apparatus may operate as follows: Fruit, such as oranges or lemons, being discharged by elevator 11 onto ropes 8, the fruit meets the air from fan 22. Under ordinary atmospheric conditions it is not necessary to use heater 26; but the addition of the heater to the apparatus allows the process of drying to be carried on irrespective of weather conditions. After passing fan 22 the fruit meets the air from fan 28; and finally an induced current of air entering the rear of the apparatus; whence it is conveyed by chute 34 to the grading apparatus or any desired place. When each piece of fruit comes to one of the rollers 5 which block its travel rearwardly, it rolls backward on said roller and ropes 8 until a second piece of fruit overtakes it, whereupon, being prevented from rolling, passes over the roller. The second piece rolls till it in turn is overtaken by another piece, and so on. The staples 32 also act to turn the fruit in a similar manner. The baffle plates 31 deflect the air upwardly between ropes 8 and among the pieces of fruit. Owing to the velocity of the air currents, the rate of evaporation is very rapid; and even when the heater 26 is used the fruit leaves the apparatus at a lower temperature than when it entered it.

While one form of the invention has been described and illustrated, various modifications may be made to adapt it to different locations. Where conditions will permit, the conveyer 11 may be dispensed with and the apparatus located beneath the floor of the building; in which case an elevator may be provided at the rear to deliver the fruit to the grading machines. The right is therefore reserved to make all such changes, modifications and improvements as come within the spirit and scope of the invention.

We claim:

1. In drying apparatus, in combination, a casing, means to produce a rapid movement of air in said casing, means to convey articles exposed to the air in said casing, and means coacting with said conveying means to turn the articles thereon to expose different sides of the articles to the moving air.

2. In a fruit drying apparatus, in combination, a casing, means in said casing to convey fruit, fruit turning means associated with said conveying means at intervals, and means to cause a rapid movement of air in a direction contrary to the direction of travel of said fruit.

3. In a fruit drying apparatus, in combination, a casing, air impelling means associated therewith, continuously moving means in the casing conveying fruit, and means associated with the conveying means and coacting therewith to turn fruit in its travel thereon to expose all sides of the fruit to the air impelled by said first mentioned means.

4. In drying apparatus, in combination, a casing, means to produce a rapid movement of air in said casing, a continuously moving conveyer having interstices therein in said casing, means associated with the conveyer and coacting therewith to turn articles being carried thereon to expose all sides of the articles to the air, and means to deflect air through said interstices.

5. In fruit drying apparatus, in combination, a casing, said casing open at both ends, means to convey fruit in said casing, means to cause air to pass over said fruit while it is being conveyed, means associated with the fruit conveying means at intervals and coacting therewith to turn fruit being carried thereon to expose all sides of the fruit to the air, and means to heat part of said air.

6. In a fruit drying apparatus, in combination, a casing, means in said casing to convey fruit, means arranged in conjunction with the conveying means and coacting therewith to turn fruit thereon at intervals to expose all sides of the fruit to the influence of a current of air, and means to cause a current of heated air to pass over said fruit while it is being conveyed.

7. In a fruit drying apparatus, in combination, coacting means for conveying and turning fruit, comprising a roller having a plurality of grooves therein, a plurality of ropes traveling in said grooves, the depth of said grooves being greater than the diameter of said ropes, substantially as described and for the purpose set forth.

8. In fruit drying apparatus, in combination, an endless rope conveyer, means to cause a current or air contiguous to said conveyer, means arranged to coact with said conveyer to turn fruit carried thereon to expose all sides of the fruit to the action of the air, and means to render said air capable of absorbing moisture.

9. In drying apparatus, in combination, a conveyer comprising grooved drums and ropes traveling in the grooves on said drums, and means retaining said ropes in said grooves and serving to turn articles carried by said conveyer.

10. In drying apparatus, in combination, a conveyer comprising grooved drums and ropes traveling in the grooves on said drums, and staples retaining said ropes in said grooves and arranged to turn articles carried by said conveyer.

11. In drying apparatus, in combination, a casing, means to produce a rapid movement of air in the casing, a conveyer in said casing, said conveyer comprising grooved drums and endless cables traveling in the grooves on said drums, and means associated with said cables for turning articles being conveyed thereon and thereby expose all sides of the articles to the air.

12. In drying apparatus, in combination a casing, means to produce a rapid movement of air in the casing, a conveyer in said casing, said conveyer comprising grooved drums and a plurality of endless ropes traveling in the grooves on said drums, and rollers associated with said ropes and coacting therewith to turn articles being conveyed thereon to thereby expose all sides of the articles to said air.

13. In drying apparatus, in combination, a casing open at its ends, means to produce a rapid movement of air in the casing, a single continuously moving conveyer in said casing, said conveyer comprising grooved drums and a plurality of endless ropes traveling in the grooves on said drums, rollers associated with said ropes and coacting therewith to turn articles being conveyed thereon to thereby expose all sides of the articles to said air, substantially as described.

14. In drying apparatus, in combination, a casing open at its ends, means to produce a rapid movement of air in the casing, a single continuously moving conveyer in said casing, said conveyer comprising grooved drums and a plurality of endless ropes traveling in the grooves on said drums, rollers associated with said ropes and coacting therewith to turn articles being conveyed thereon to thereby expose all sides of the articles to said air, an elevator arranged at one end of said casing and adapted to deliver articles to said conveyer, and a chute at the other end of said casing, substantially as described.

In testimony whereof, we have signed our names to this specification in the presence of two subscribing witnesses at Santa Ana, county of Orange State of California, this 10 day of June A. D. 1908.

ERNEST D. HOUGH.
EDWARD E. WILSON.

Witnesses as to signature of Ernest D. Hough:
ANNA A. BALTZ,
HORATIO J. FORGY.

Witnesses as to signature of Edward E. Wilson:
A. GILES JOHNSON,
ANNA A. BALTZ.